US012752840B2

(12) United States Patent
Lee

(10) Patent No.: US 12,752,840 B2
(45) Date of Patent: Oct. 6, 2026

(54) APPARATUS AND METHOD FOR CONTROLLING FOUR-WHEEL INDEPENDENT STEERING VEHICLE

(71) Applicant: HYUNDAI MOBIS CO., LTD., Seoul (KR)

(72) Inventor: Jong Min Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 162 days.

(21) Appl. No.: 18/744,088

(22) Filed: Jun. 14, 2024

(65) Prior Publication Data

US 2025/0136175 A1 May 1, 2025

(30) Foreign Application Priority Data

Oct. 31, 2023 (KR) ........................ 10-2023-0148083

(51) Int. Cl.
*B62D 6/00* (2006.01)
*B62D 15/02* (2006.01)

(52) U.S. Cl.
CPC ............. *B62D 6/002* (2013.01); *B62D 6/001* (2013.01); *B62D 15/0285* (2013.01)

(58) Field of Classification Search
CPC .... B62D 6/002; B62D 6/001; B62D 15/0285; B62D 7/1509; B62D 7/15; B62D 15/027; B60W 40/02; B60Y 2400/84
USPC ............................................................ 701/41
See application file for complete search history.

(56) References Cited

U.S. PATENT DOCUMENTS

| | | | | |
|---|---|---|---|---|
| 2015/0100193 | A1* | 4/2015 | Inagaki | B60W 30/06 701/23 |
| 2021/0380165 | A1 | 12/2021 | Chao | |
| 2024/0278773 | A1* | 8/2024 | Holler | B60K 17/358 |
| 2024/0286602 | A1* | 8/2024 | Tachiiri | B60W 30/045 |

FOREIGN PATENT DOCUMENTS

| | | | |
|---|---|---|---|
| DE | 10-2005-025-203 | A1 | 12/2006 |
| DE | 10-2021-115-823 | B3 | 8/2022 |
| JP | 2009-078693 | A | 4/2009 |
| JP | 2011-225019 | A | 11/2011 |
| KR | 10-2274120 | B1 | 9/2010 |

OTHER PUBLICATIONS

Extended European Search Report issued on Dec. 10, 2024 in the corresponding European Patent Application No. 24179745.5.

* cited by examiner

*Primary Examiner* — Yi-Kai Wang
(74) *Attorney, Agent, or Firm* — Morgan, Lewis & Bockius LLP

(57) ABSTRACT

An apparatus for controlling a four-wheel independent steering vehicle includes: a sensor module; and a processor configured to perform parking through selective control of a front-wheel drive module and a rear-wheel drive module in consideration of at least one of an angle between the four-wheel independent steering vehicle and a parking surface, a position and shape of the parking surface, or a direction of the four-wheel independent steering vehicle entering the parking surface, based on information detected through the sensor module, upon parking using a CRAB mode of the four-wheel independent steering vehicle.

9 Claims, 11 Drawing Sheets

APPARATUS AND METHOD FOR CONTROLLING FOUR-WHEEL INDEPENDENT STEERING VEHICLE

CROSS-REFERENCE TO RELATED APPLICATION

This application claims priority from and the benefit of Korean Patent Application No. 10-2023-0148083, filed on Oct. 31, 2023, which is hereby incorporated by reference for all purposes as if set forth herein.

BACKGROUND

Field

Exemplary embodiments of the present disclosure relate to an apparatus and method for controlling a four-wheel independent steering vehicle for a traveling mode in a lateral direction (or CRAB mode).

Discussion of the Background

Recently, researches are being conducted on an in-wheel motor system in which motors are respectively embedded in four wheels of a vehicle and independently operate the four wheels.

The in-wheel motor system may be organically coupled to the vehicle to implement a four-wheel independent driving and four-wheel independent steering system, thereby providing more flexible and various traveling performance.

A four-wheel independent steering vehicle includes a steering angle sensor for each steering apparatus (e.g., a front wheel steering apparatus, a rear wheel steering apparatus).

A conventional and general vehicle changes a traveling direction thereof by steering only front wheels. For this reason, the traveling direction of the vehicle does not coincide with a viewing direction of a driver because occasions when the front and rear wheels generate lateral forces are different. However, in the four-wheel independent steering vehicle, the steering system is applied to the rear wheels as well, thereby reducing a rotation radius of the vehicle while the driver parks the vehicle or turns the vehicle at low velocity and improving traveling stability when the driver changes the direction of the vehicle while driving the vehicle at high velocity.

Among the traveling modes of the four-wheel independent steering vehicle, the traveling mode in a lateral direction (or CRAB mode), as illustrated in FIG. 1, is a mode that allows the vehicle to travel in the lateral direction (that is, a lateral direction of 90 degrees on the front), which facilitates parking in a narrow space.

However, as illustrated in FIG. 2, there is a problem in that it is not possible to perform ideal parking using the CRAB mode as described above in FIG. 1, depending on an angle between the vehicle and a parking surface (see FIG. 2A), a position and shape of the parking surface (e.g., a curved road, an arterial road, a corner portion, and the like) (see FIG. 2B), and a direction of the vehicle entering the parking surface (e.g., a lateral direction and a longitudinal direction) (see FIG. 2C).

Therefore, there is a need for a method of controlling the traveling mode in a lateral direction (or CRAB mode) for each steering apparatus (e.g., a front wheel steering apparatus, a rear wheel steering apparatus) separately depending on the angle between the vehicle and the parking surface, the position and shape of the parking surface, and the direction of the vehicle entering the parking surface, and the like, in order to automatically perform safe and fast parking.

SUMMARY

According to one aspect of the present disclosure, various embodiments are directed to providing an apparatus and method for controlling a four-wheel independent steering vehicle, which is capable of separately controlling a traveling mode in a lateral direction (or CRAB mode) on each steering apparatus of the four-wheel independent steering vehicle to allow the vehicle to automatically perform safe and fast parking in various parking situations.

There is provided an apparatus for controlling a four-wheel independent steering vehicle according to one aspect of the present disclosure, the apparatus may include: a sensor module; and a processor configured to perform parking through selective control of a front-wheel drive module and a rear-wheel drive module in consideration of at least one of an angle between the vehicle and a parking surface, a position and shape of the parking surface, or a direction of the vehicle entering the parking surface, based on information detected through the sensor module, upon parking using a CRAB mode of the four-wheel independent steering vehicle.

In an embodiment, the processor may check whether the parking surface is available for parking in a lateral direction or a longitudinal direction based on the information detected through the sensor module.

In an embodiment, the processor may check whether a longitudinal direction of the vehicle is parallel to a longitudinal direction of the parking surface or a long side of a rectangle that marks the parking surface, when the parking surface is available for parking in the lateral direction.

In an embodiment, when the longitudinal direction of the vehicle is not parallel to the longitudinal direction of the parking surface, the processor may control a drive module that drives a wheel that is further from the long side of the parking surface, among the front-wheel drive module and the rear-wheel drive module, according to a specified setting, to control the vehicle to approach the parking surface so that the longitudinal direction of the vehicle becomes parallel to the longitudinal direction of the parking surface.

In an embodiment, when the longitudinal direction of the vehicle is not parallel to the longitudinal direction of the parking surface, the processor may control a drive module that drives a wheel that is closer to the long side of the parking surface, among the front-wheel drive module and the rear-wheel drive module, according to a specified setting, to control the vehicle to move away from the parking surface so that the longitudinal direction of the vehicle becomes parallel to the longitudinal direction of the parking surface.

In an embodiment, the processor may simultaneously control the front-wheel drive module and the rear-wheel drive module in the CRAB mode, when the longitudinal direction of the vehicle is parallel to the longitudinal direction of the parking surface, to move the vehicle in the lateral direction to park the vehicle onto the parking surface.

In an embodiment, when the parking surface is available for parking in the longitudinal direction, the processor may check whether an angle of a longitudinal direction of the vehicle with respect to a reference direction is identical to an angle of a longitudinal direction of the parking surface or an angle of a long side of a rectangle that marks the parking surface with respect to the reference direction.

In an embodiment, when the angle of the longitudinal direction of the vehicle with respect to the reference direction is not identical to the angle of the longitudinal direction of the parking surface or the angle of the long side of the rectangle that marks the parking surface with respect to the reference direction, the processor may control the front-wheel drive module and the rear-wheel drive module in opposite directions to each other to rotate the vehicle such that the angle of the longitudinal direction of the parking surface and the angle of the longitudinal direction of the vehicle with respect to the reference direction are identical.

In an embodiment, when the angle of the longitudinal direction of the vehicle with respect to the reference direction becomes identical to the angle of the longitudinal direction of the parking surface or the angle of the long side of the rectangle that marks the parking surface with respect to the reference direction, the processor may simultaneously control the front-wheel drive module and the rear-wheel drive module in the CRAB mode to move the vehicle in the lateral direction within a range in which the vehicle is able to enter the parking surface, and then to move the vehicle in the longitudinal direction onto the parking surface to park the vehicle.

There is provided a method of controlling a four-wheel independent steering vehicle according to another aspect of the present disclosure, the method may include: detecting, by a processor, an angle between a longitudinal direction of a parking surface and a longitudinal direction of the four-wheel independent steering vehicle through a sensor module upon parking using a CRAB mode of the four-wheel independent steering vehicle; and performing, by the processor, the parking through selective control of a front-wheel drive module and a rear-wheel drive module, based on information detected through the sensor module, in consideration of at least one of the angle between the vehicle and the parking surface, a position and shape of the parking surface, or a direction of the vehicle entering the parking surface.

According to one aspect of the present disclosure, a traveling mode in a lateral direction (or CRAB mode) is separately controlled on each steering apparatus of the four-wheel independent steering vehicle to allow a vehicle to automatically perform safe and fast parking in various parking situations.

DETAILED DESCRIPTION OF THE ILLUSTRATED EMBODIMENTS

Figure 1:
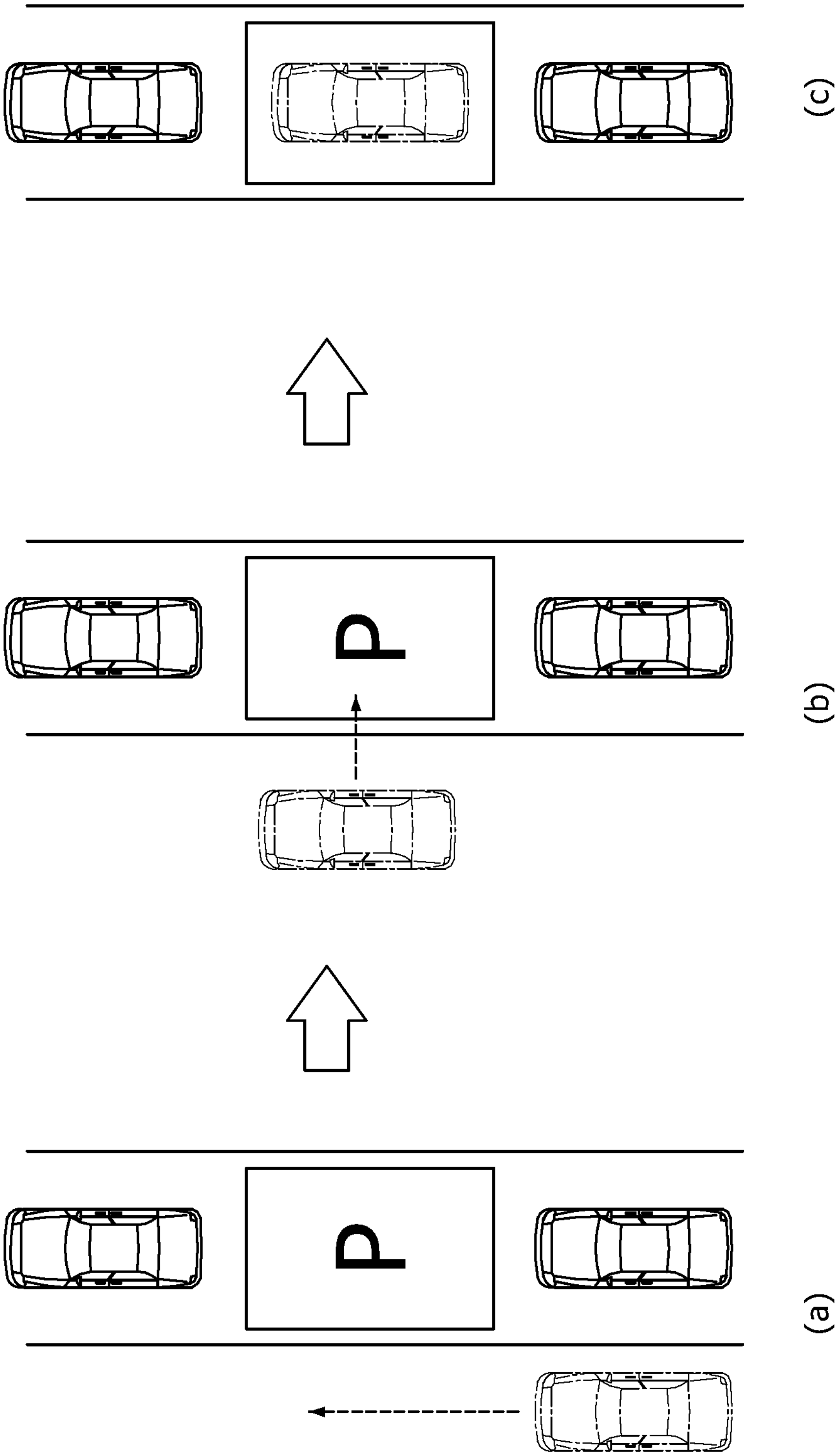
FIG. 1 is an exemplified view for describing an ideal parking method using a CRAB mode of a four-wheel independent steering vehicle.
Figure 2:
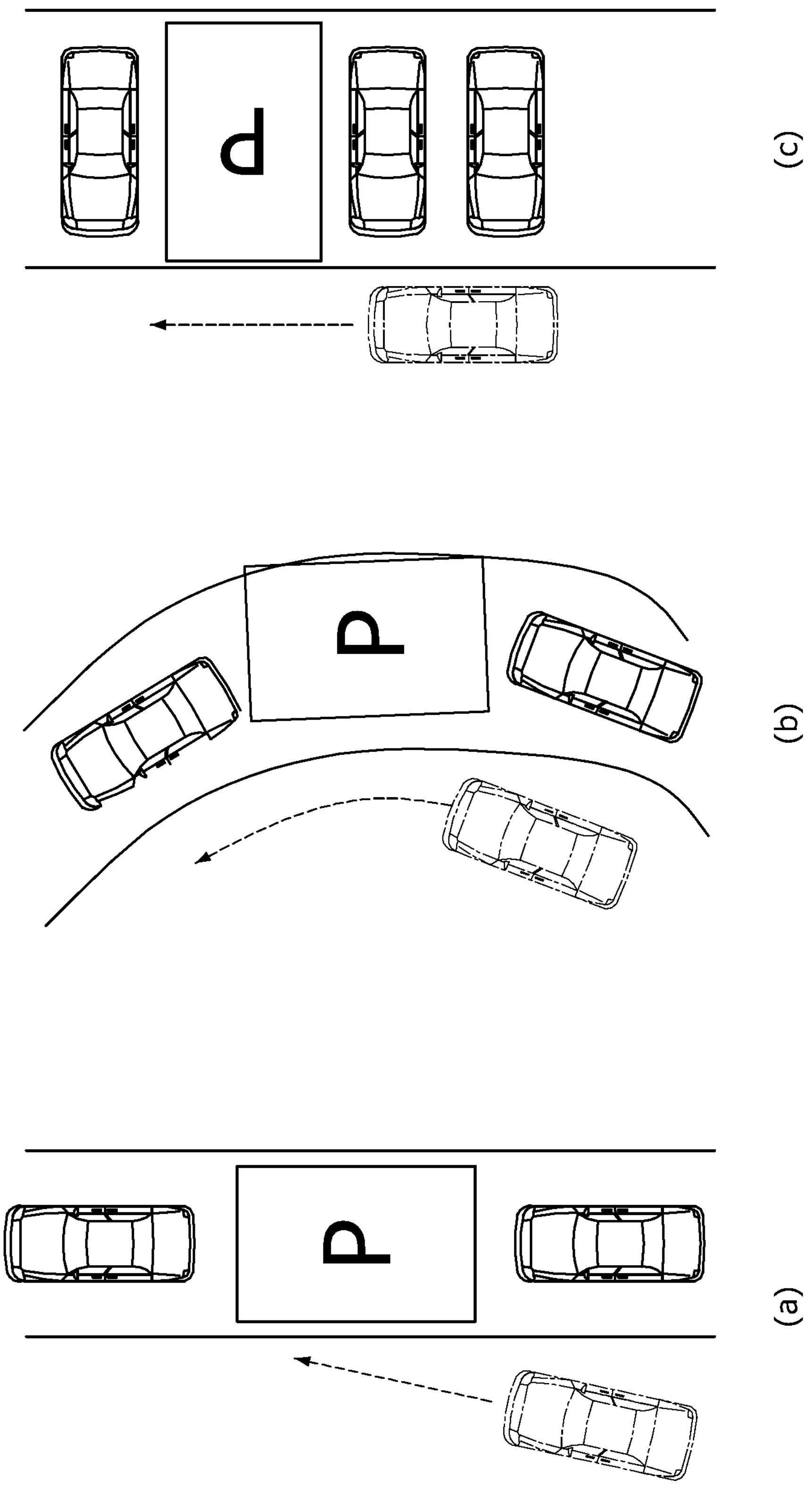
FIG. 2 is an exemplified view for describing a parking situation in which an ideal parking is unable to be performed using the CRAB mode of the four-wheel independent steering vehicle.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being “linked,” “coupled,” or “connected” to another component, it is understood that not only a direct connection relationship but also an indirect connection relationship through an intermediate component may also be included. In addition, when a component is referred to as “comprising” or “having” another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an apparatus and method for controlling a four-wheel independent steering vehicle will be described below with reference to the accompanying drawings through various exemplary embodiments.

Figure 3:
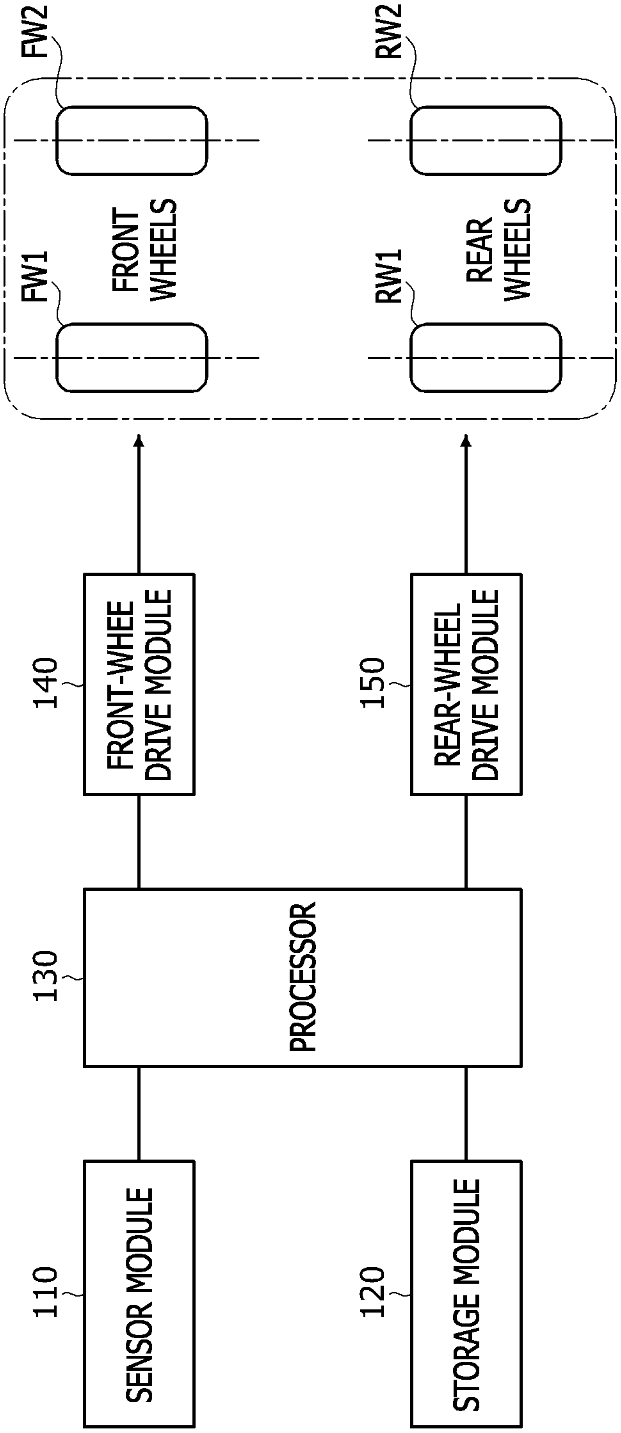
FIG. 3 is an exemplified view illustrating a schematic configuration of an apparatus for controlling a four-wheel independent steering vehicle according to one embodiment of the present disclosure.

FIG. 3 is an exemplified view illustrating a schematic configuration of an apparatus for controlling a four-wheel independent steering vehicle according to one embodiment of the present disclosure.

As illustrated in FIG. 3, an apparatus for controlling a four-wheel independent steering vehicle according to the present embodiment includes a sensor module 110, a storage module 120, a processor 130, a front-wheel drive module 140, and a rear-wheel drive module 150.

The sensor module 110 may include a current sensor (that is, a current detection sensor) and a steering angle sensor (that is, a steering angle detection sensor).

In addition, the sensor module 110 may include a camera (image sensor) to check a parking surface (parking space).

In addition, the sensor module 110 may include an ultrasonic sensor or an infrared sensor to measure a distance (or length).

In addition, the sensor module 110 may include wheel speed sensors included in the front and rear wheels, respectively, and an acceleration sensor to detect the acceleration of the vehicle.

The processor 130 may measure steering angle speed using the steering angle sensor.

In addition, the processor 130 may control the steering angles of the front and rear wheels.

The storage module 120 may store an algorithm for the processor 130 to control the steering angles of the front and rear wheels, and an algorithm for the processor 130 to separately control a traveling mode in a lateral direction (or CRAB mode) on each steering apparatus of the four-wheel independent steering vehicle for safe and fast parking in various parking situations.

In this case, the storage module 120 and the processor 130 may each be implemented as a separate chip, or as a single chip that includes the storage module 120 inside the processor 130.

The storage module 120 may be implemented as at least one of non-volatile memory elements such as a cache, a read-only memory (ROM), a programmable ROM (PROM), an erasable programmable ROM (EPROM), an electrically erasable programmable ROM (EEPROM), and a flash memory, volatile memory elements such as a random access memory (RAM), or storage media such as a hard disc drive (HDD) and a CD-ROM, but is not limited thereto.

In addition, the processor 130 may be implemented as an electronic control unit (ECU) that controls the traveling of the vehicle.

The front-wheel drive module 140 is connected to front wheels FW1 and FW2 and may drive an actuator of the front wheels FW1 and FW2 (e.g., an actuator that adjusts a direction of rotation, rotational speed, and steering angle of the front wheels, by a motor or hydraulic pressure), respectively, according to control of the processor 130.

The front-wheel drive module 140 may be included in the processor 130.

The rear-wheel drive module 150 is connected to rear wheels RW1 and RW2 and may drive an actuator of the rear wheels RW1 and RW2 (e.g., an actuator that adjusts a direction of rotation, rotational speed, and steering angle of the rear wheels, by a motor or hydraulic pressure), respectively, according to control of the processor 130.

The rear-wheel drive module 150 may be included in the processor 130.

The processor 130 controls the front-wheel drive module 140 and the rear-wheel drive module 150 to control the steering angles of the front and rear wheels to be identical to each other, or to be different from each other.

Figure 7:
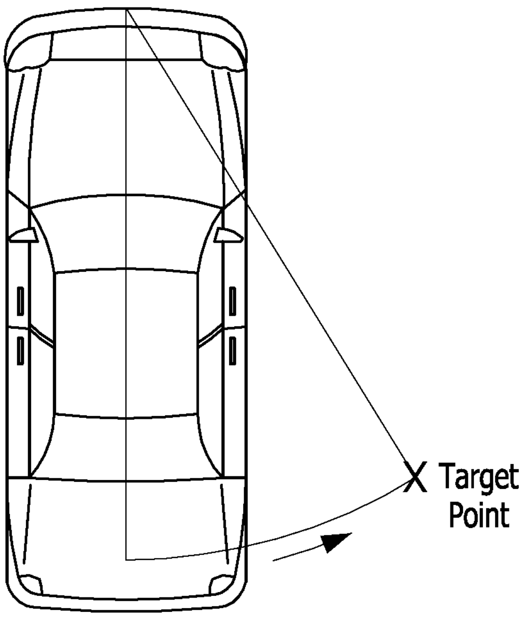
FIG. 7 is an exemplified view illustrated for describing an operation of displaying a target steering angle and a target steering trajectory on an around view screen during parking in the CRAB mode in FIG. 4.

The processor 130 may display a target steering angle and a target steering trajectory on an around view screen during parking in a CRAB mode (see FIG. 7).

Hereinafter, a specific operation of the processor 130 will be described.

Figure 4:
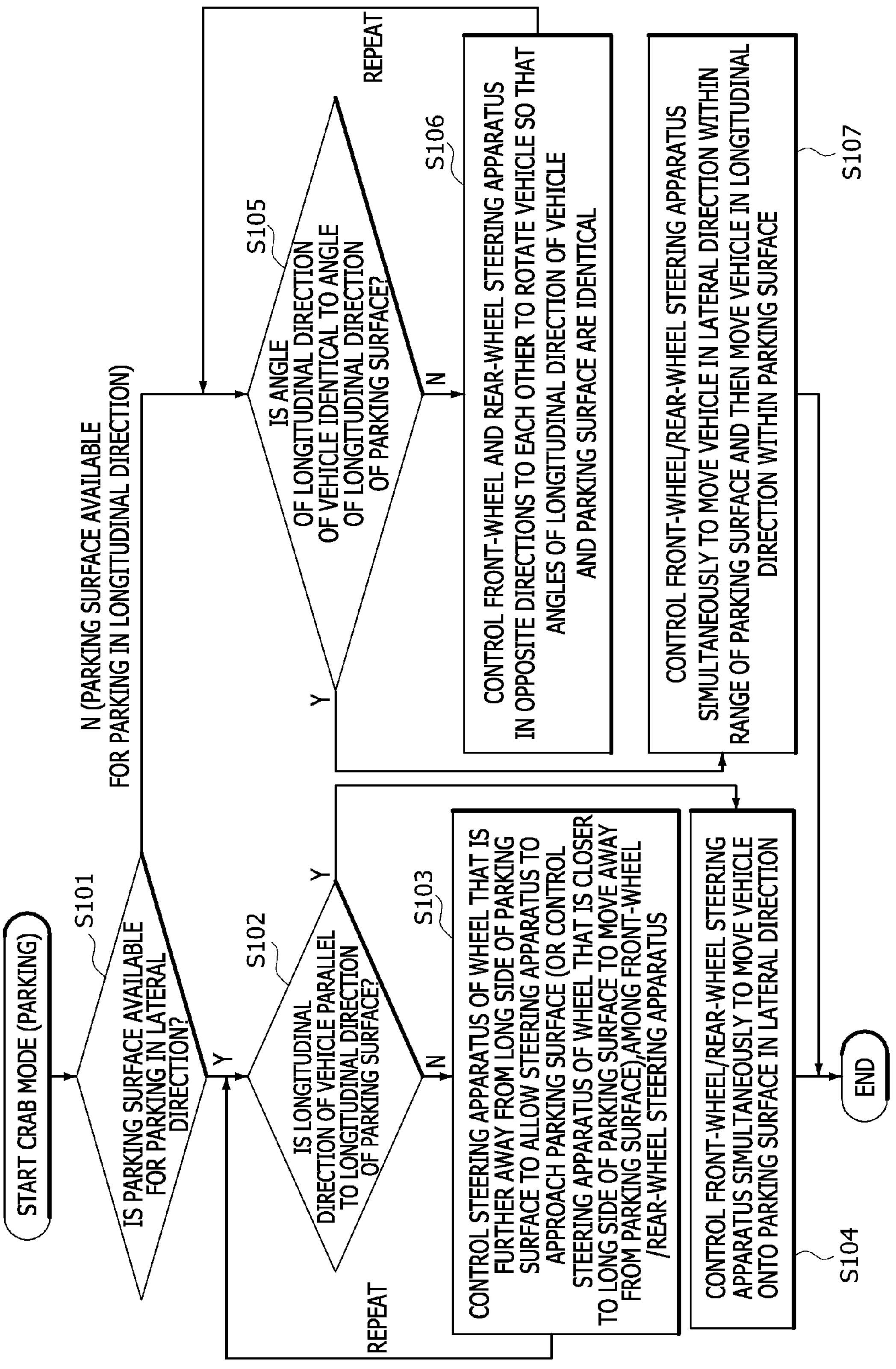
FIG. 4 is a flowchart for exemplarily describing a method of controlling the four-wheel independent steering vehicle according to one embodiment of the present disclosure.

FIG. 4 is a flowchart for exemplarily describing a method of controlling the four-wheel independent steering vehicle according to one embodiment of the present disclosure, and a flowchart for describing a method of separately controlling the CRAB mode for each steering apparatus of the four-wheel independent steering vehicle, such that safe and fast parking may be automatically performed in various parking situations.

Figure 5:
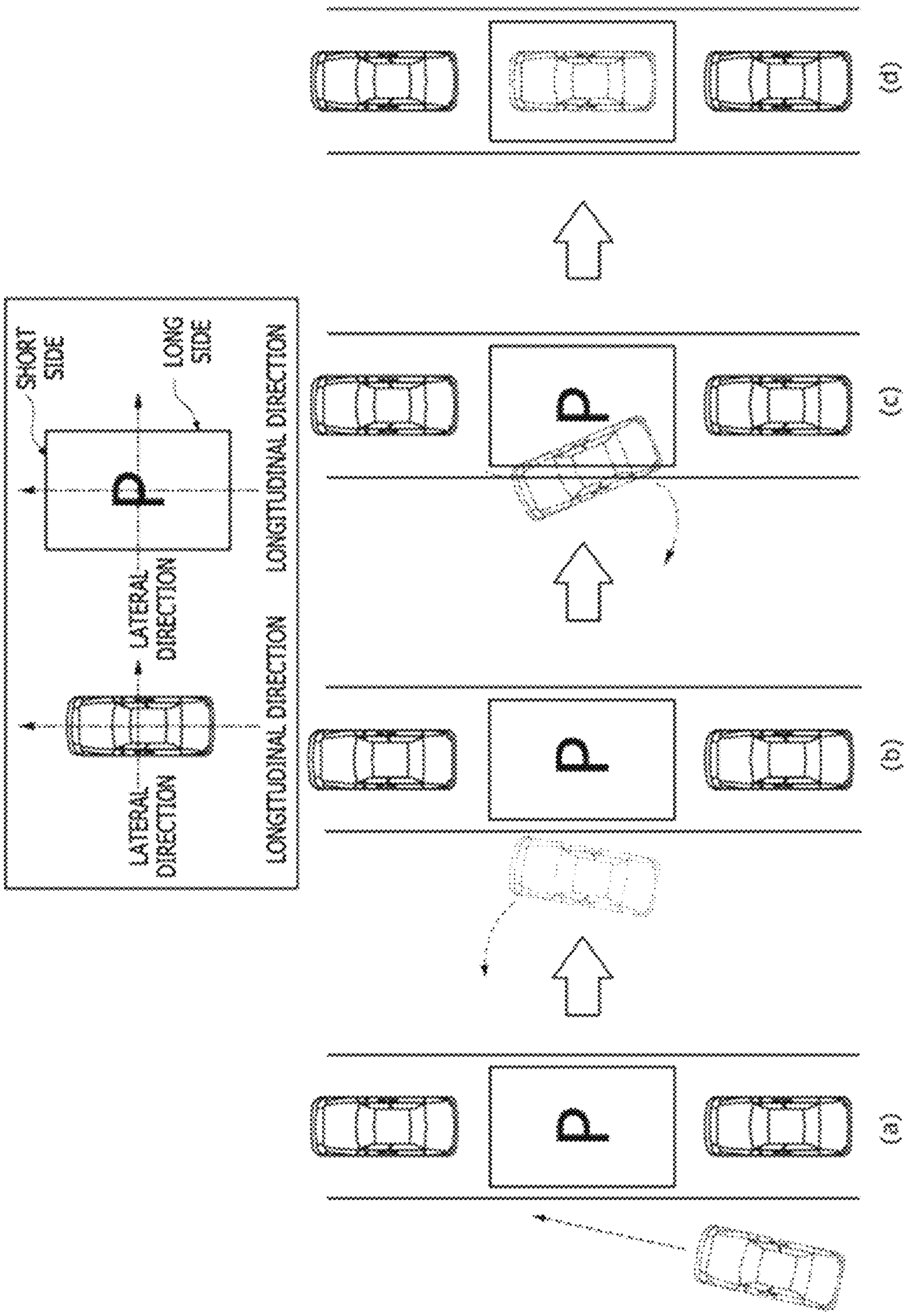
FIG. 5 is an exemplified view for describing an operation of performing parking in a lateral direction by separately controlling the CRAB mode of each steering apparatus of the four-wheel independent steering vehicle in FIG. 4.
Figure 6:
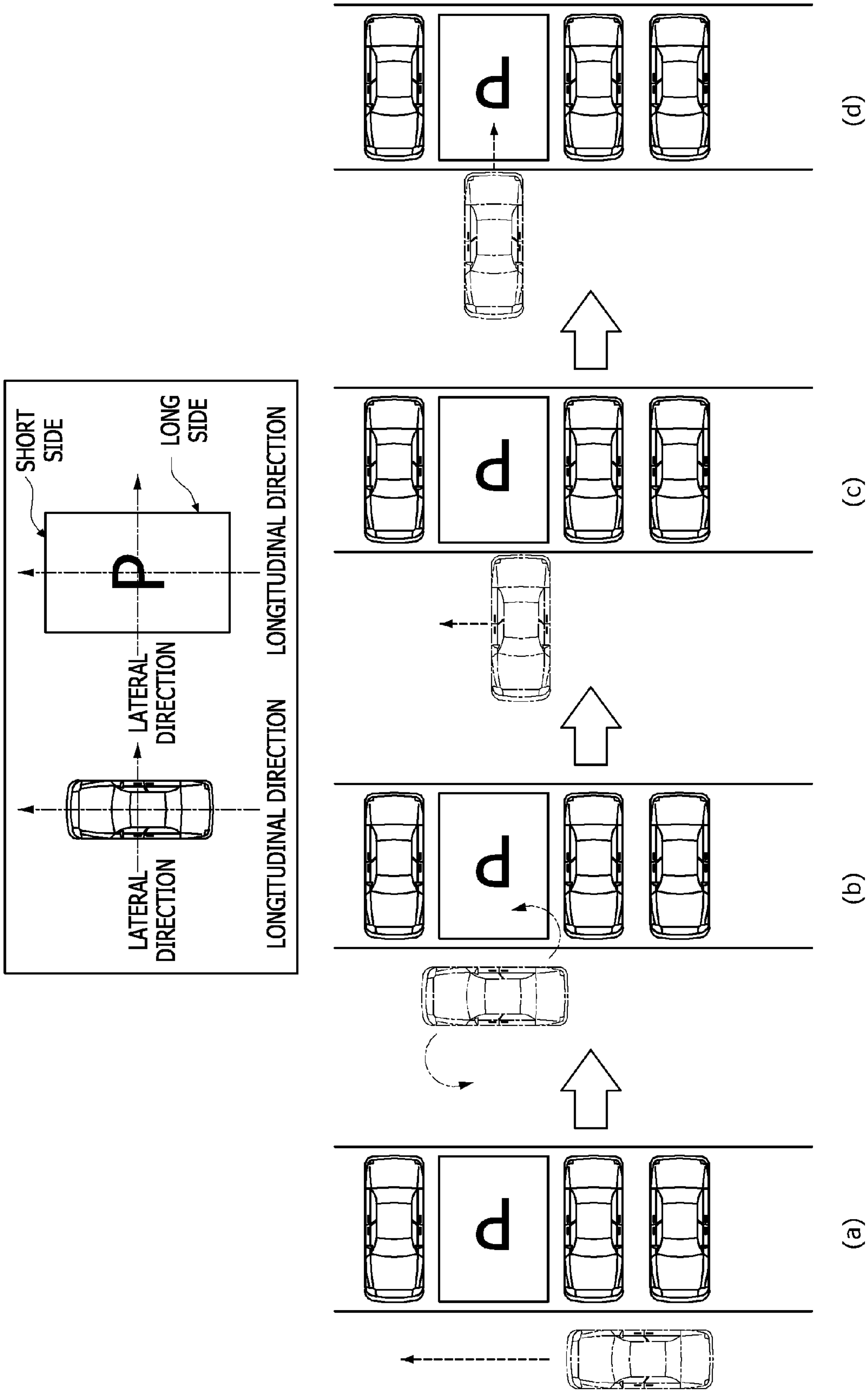
FIG. 6 is an exemplified view for describing an operation of performing parking in a longitudinal direction by separately controlling the CRAB mode of each steering apparatus of the four-wheel independent steering vehicle in FIG. 4.

FIG. 5 is an exemplified view for describing an operation of performing parking in a lateral direction by separately controlling the CRAB mode of each steering apparatus of the four-wheel independent steering vehicle in FIG. 4, and FIG. 6 is an exemplified view for describing an operation of performing parking in a longitudinal direction by separately controlling the CRAB mode of each steering apparatus of the four-wheel independent steering vehicle in FIG. 4.

With reference to FIG. 4, when initiating the parking in the CRAB mode, the processor 130 checks whether a parking surface (or parking space) is available for parking in the lateral direction (or longitudinal direction) (S101).

For example, when there is a parking space available, the processor 130 may check, based on information on the parking surface (or parking space) measured through the sensor module 110, whether a length of the parking surface (or parking space) is greater than a length of the vehicle (that is, parking in the lateral direction is possible) or whether the length of the parking surface (or parking space) is less than the length of the vehicle but greater than a width of the vehicle (that is, parking in the longitudinal direction is possible).

When the parking surface (or parking space) is available for the parking in the lateral direction as a result of the checking in S101 (Yes in S101), the processor 130 checks whether a longitudinal direction of the vehicle is parallel to a longitudinal direction of the parking surface (or a long side of a rectangle that marks the parking surface) (S102).

When the longitudinal direction of the vehicle is not parallel to the longitudinal direction of the parking surface (No in S102) as a result of the checking in S102 (see FIG. 5A), the processor 130 controls a steering apparatus (i.e., drive module) of a wheel that is further from the long side of the parking surface to approach the parking surface, among the front-wheel/rear-wheel steering apparatuses (i.e., front-wheel drive module 140, or rear-wheel drive module 150) (S103).

For example, with reference to FIG. 5B, since the wheel that is further from the long side of the parking surface is the rear wheel, the processor 130 may control the rear-wheel drive module 150 to allow a rear wheel portion to approach the parking surface in order to ensure that the longitudinal direction of the vehicle is parallel to the longitudinal direction of the parking surface. In addition, with reference to FIG. 5C, since the wheel that is further from the long side of the parking surface is the front wheel, the processor 130 may control the front-wheel drive module 140 to allow a front wheel portion to approach the parking surface in order to ensure that the longitudinal direction of the vehicle is parallel to the longitudinal direction of the parking surface.

Meanwhile, although not illustrated in the drawings, a steering apparatus (that is, drive module) of a wheel that is closer to the long side of the parking surface may be controlled to move away from the parking surface. For example, with reference to FIG. 5B, since the wheel that is closer to the long side of the parking surface is the front wheel, the processor 130 may control the front-wheel drive module 140 to allow the front wheel portion to move away from the parking surface in order to ensure that the longitudinal direction of the vehicle is parallel to the longitudinal direction of the parking surface. In addition, with reference to FIG. 5C, since the wheel that is closer to the long side of the parking surface is the rear wheel, the processor 130 may control the rear-wheel drive module 140 to allow the rear wheel portion to move away from the parking surface in order to ensure that the longitudinal direction of the vehicle is parallel to the longitudinal direction of the parking surface.

In this case, the processes S102 and S103 that allow the longitudinal direction of the vehicle to be parallel to the longitudinal direction of the parking surface may be repeated by controlling one of the front-wheel/rear-wheel steering apparatus (that is, the front-wheel drive module 140, or the rear-wheel drive module 150).

Accordingly, when the longitudinal direction of the vehicle is parallel to the longitudinal direction of the parking surface (Yes in S102), the processor 130 may simultaneously control the front-wheel/rear-wheel steering apparatuses (that is, the front-wheel drive module 140, or the rear-wheel drive module 150) to move the vehicle in the lateral direction onto the parking surface to park the vehicle (S104) (see FIG. 5D).

That is, as described above in FIG. 1, the parking in the lateral direction is made possible with the ideal parking method using the CRAB mode of the four-wheel independent steering vehicle.

Meanwhile, when the parking surface (or parking space) is available for the parking in the longitudinal direction as the result of the checking in S101 (No in S101), the processor 130 checks whether an angle of the longitudinal direction of the vehicle with respect to a reference direction is identical to the longitudinal direction of the parking surface (or an angle of the long side of the rectangle that marks the parking surface) with respect to the reference direction within a specified error range (S105).

When the angle of the longitudinal direction of the vehicle with respect to the reference direction is not identical to the longitudinal direction of the parking surface (or the angle of the long side of the rectangle that marks the parking surface) with respect to the reference direction within the specified error range as the result of the checking in S102 (No in S105) (see FIG. 6A), the processor 130 controls the front-wheel/rear-wheel steering apparatus (that is, the front-wheel drive module 140, or the rear-wheel drive module 150) in opposite directions to each other to rotate the vehicle so that the angle of the longitudinal direction of the parking surface and the angle of the longitudinal direction of the vehicle with respect to the reference direction are identical within the specified error range (S106).

For example, with reference to FIG. 6B, the front wheels of the vehicle are controlled in a direction away from the long side of the parking surface (e.g., to the left) and the rear wheels of the vehicle are controlled in a direction closer to the long side of the parking surface (e.g., to the right) to rotate the vehicle. In this case, the direction of rotation is not limited, and the front wheels and rear wheels of the vehicle may be controlled in opposite directions.

In this case, the front-wheel/rear-wheel steering apparatus (that is, the front-wheel drive module 140 or the rear-wheel drive module 150) may be controlled in opposite directions to each other, and the process S105 and S106 of rotating the vehicle may be repeated such that the angle of the longitudinal direction of the parking surface and the angle of the longitudinal direction of the vehicle with respect to the reference direction are identical within the specified error range.

Accordingly, when the angle of the longitudinal direction of the parking surface and the angle of the longitudinal direction of the vehicle with respect to the reference direction become identical within the specified error range (Yes in S105), the processor 130 may simultaneously control the front-wheel/rear-wheel steering apparatus (that is, the front-wheel drive module 140, or the rear-wheel drive module 150) to move the vehicle in the lateral direction within the range of the parking surface (see FIG. 6C), and then move the vehicle in the longitudinal direction onto the parking surface to park the vehicle (S107) (see FIG. 6D).

For reference, in the present embodiment, the angle of the longitudinal direction of the parking surface with respect to the reference direction being identical to the longitudinal angle of the vehicle with respect to the reference direction within the specified error range means that only the angle of the longitudinal direction with respect to the reference direction is identical before the vehicle is parked onto the parking surface. Therefore, in order to park the vehicle onto the parking surface, an operation is required to move the vehicle in the lateral direction within the range of the parking surface without interference from surrounding obstacles (see FIG. 6C).

FIG. 7 is an exemplified view illustrated for describing an operation of displaying a target steering angle and a target steering trajectory on an around view screen during parking in the CRAB mode in FIG. 4.

The processor 130 may recognize and calculate a distance to a surrounding structure based on information measured through the sensor module 110, and output an around view screen through a display apparatus (not illustrated) provided in the vehicle, and may calculate and display the distance to the surrounding structure and other target control values required for parking (e.g., a target steering angle of the front or rear wheels, a target steering trajectory of the front or rear wheels, and the like) through the around view screen, and may display whether parking is possible or impossible from results of the calculation.

In addition, the processor 130 recognizes the vehicle and a surrounding environment in real time while displaying the target steering angle and the target steering trajectory on the around view screen, thereby supporting intuitive and easy operation (parking), and guiding the process of performing a parking operation to a user so that the user may have a sense of convenience and stability.

Therefore, the processor 130 may output guidance information through the around view screen to support the parking assistance function and guide whether the parking assistance function is supported (that is, whether the vehicle needs to be parked manually), guidance on a target point and course, whether there are interference with the surrounding structures and safety results, and the like.

The processor 130 may control acceleration and deceleration pedals using the assistance function to support driving (parking) when a driver is present, and may support calculating a target point on each wheel (that is, the front and rear wheels) and automatic control functions for deceleration and acceleration in the case of unmanned parking.

FIGS. 8 to 11 are exemplified views for describing a method of calculating a target point for each front and rear wheel during parking in the lateral direction, in FIG. 5. However, this calculation method is illustrative and is not intended to be limited.

Figure 8:
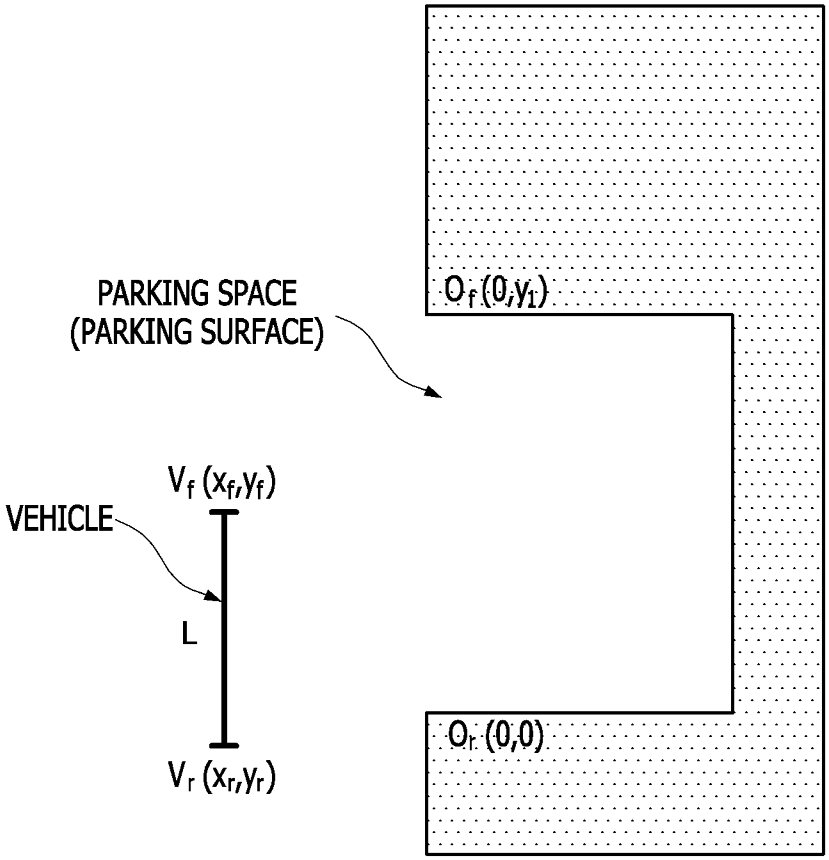
FIGS. 8, 9, 10, and 11 are exemplified views for describing a method of calculating a target point for each front and rear wheel during parking in the lateral direction, in FIG. 5.

In FIG. 8, the processor 130 checks whether $y_r<0+l_8$ is satisfied.

Here, $V_f(x_f, y_f)$ is a coordinate of a front wheel, $V_r(x_r, y_r)$ is a coordinate of a rear wheel, $l_8$ is a safety distance to be calculated as 0.5, and L means a length of a vehicle, and based on which, the processor 130 checks whether there is interference in traveling for parking in the lateral direction (that is, parallel parking), and activates cooperative control of driving and braking when $l_8$ (safety distance) is 0.5 or less.

In addition, the processor 130 checks whether $$\sqrt{x_f^2 + y_f^2} > C_s L$$

is satisfied.

$C_8$ is a safety factor, which is calculated to be 1.2, and the processor 130 calculates an interference distance between a front portion $V_f$ of the vehicle and a structure $(O_f, O_r)$, and checks whether the distance is equal to or greater than a value made by multiplying a wheelbase of the vehicle and the safety factor.

Figure 9:
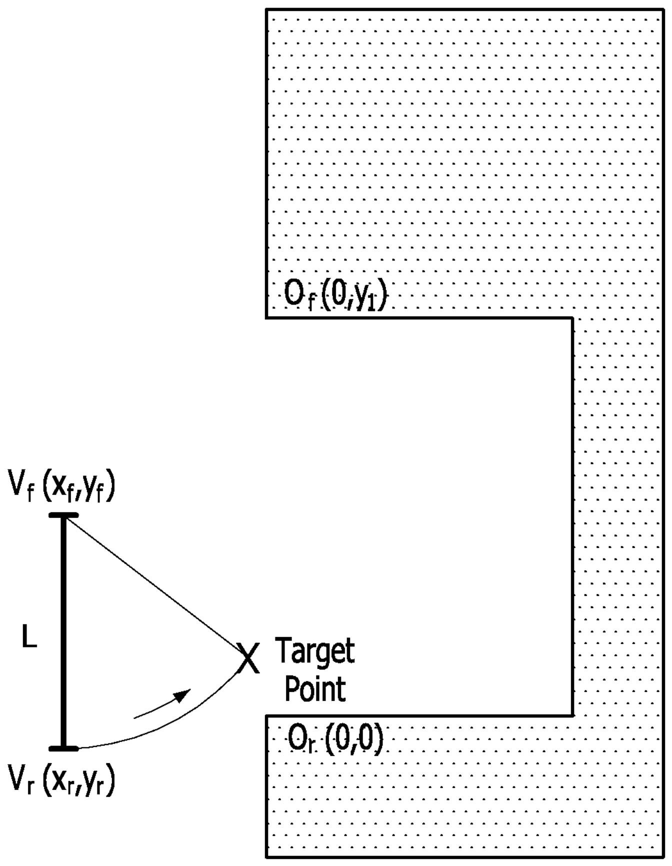

With reference to FIG. 9, the processor 130 calculates a target point $(y_{r,t})$ for the rear wheel.

Here, $$y_{r,t} = \frac{y_1 - L}{2}$$

The processor 130 displays the target point on the around view screen, and in the CRAB mode, all four wheels may maintain an angle of 90 degrees. However, the processor 130 may generate an additional steering motion through the drive, and perform cooperative control of the drive and steering. In addition, the processor 130 may move (change) the target point to correspond to the driver's acceleration/deceleration operations.

Figure 10:
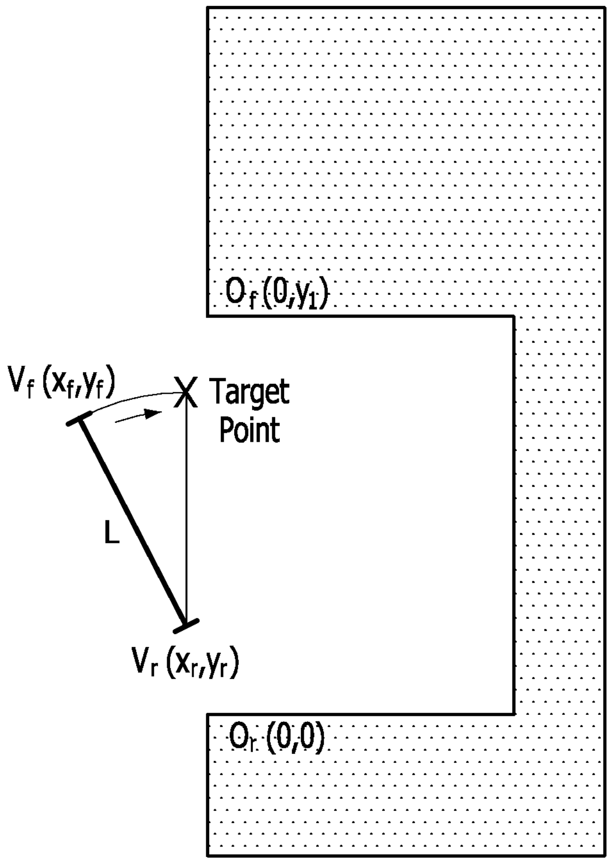

With reference to FIG. 10, the processor 130 performs calculating and checking the interference distance between the rear portion $V_r$ of the vehicle and the structure $(O_f, O_r)$.

The processor 130 checks whether $$\sqrt{x_r^2 + (y_r + y_1)2} > C_8 L$$

is satisfied.

The processor 130 calculates a target point $(y_{f,t})$ for the front wheel based on the current reference of $y_r$.

Here, $y_{f,t}=y_r+L$

The processor 130 displays the target point on the around view screen, and in the CRAB mode, all four wheels may maintain an angle of 90 degrees. However, the processor 130 may generate an additional steering motion through the drive, and perform cooperative control of the drive and steering. In addition, the processor 130 may move (change) the target point to correspond to the driver's acceleration/deceleration operations.

Figure 11:
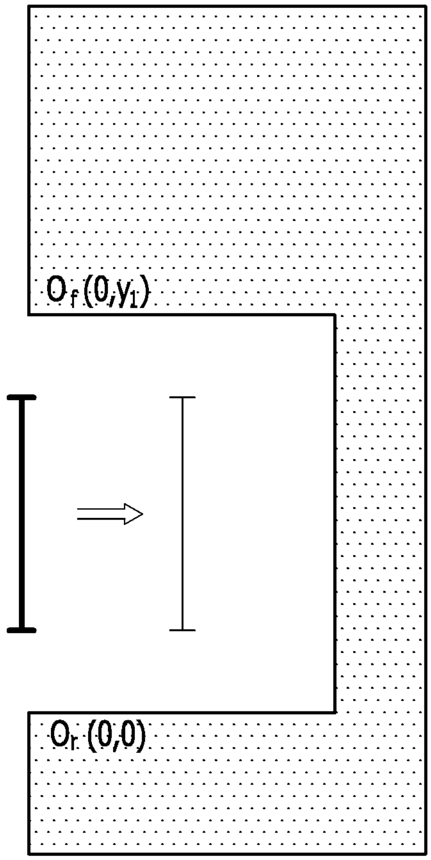

With reference to FIG. 11, the processor 130 may assist the driver's acceleration/deceleration operations or automatically move the vehicle in the lateral direction to park in the parking space (parking surface).

As described above, the present disclosure may separately control a traveling mode in a lateral direction (or CRAB mode) on each steering apparatus of the four-wheel independent steering vehicle to assist the driver's acceleration and deceleration operations in various parking situations, or to allow the vehicle to automatically perform safe and fast parking.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a four-wheel independent steering vehicle, the apparatus comprising:

a sensor module; and a processor configured to perform parking through selective control of a front-wheel drive module and a rear-wheel drive module in consideration of at least one of an angle between the four-wheel independent steering vehicle and a parking surface, a position and shape of the parking surface, or a direction of the four-wheel independent steering vehicle entering the parking surface, based on information detected through the sensor module, upon parking using a CRAB mode of the four-wheel independent steering vehicle, wherein, when a longitudinal direction of the four-wheel independent steering vehicle is not parallel to a long side of the parking surface, the processor selectively controls a drive module that drives a wheel closer to the long side of the parking surface, among the front-wheel drive module and the rear-wheel drive module, according to a specified setting, to control the four-wheel independent steering vehicle to move away from the parking surface so that the longitudinal direction of the four-wheel independent steering vehicle becomes parallel to the long side of the parking surface.

2. The apparatus of claim 1, wherein the processor checks whether the parking surface is available for parking in a lateral direction or a longitudinal direction based on the information detected through the sensor module.

3. The apparatus of claim 2, wherein the processor checks whether a longitudinal direction of the four-wheel independent steering vehicle is parallel to the longitudinal direction of the parking surface or the long side of a rectangle that marks the parking surface, when the parking surface is available for parking in the lateral direction.

4. The apparatus of claim 3, wherein, when the longitudinal direction of the four-wheel independent steering vehicle is not parallel to the long side of the parking surface, the processor selectively controls a drive module that drives a wheel that is further from the long side of the parking surface, among the front-wheel drive module and the rear-wheel drive module, according to a specified setting, to control the four-wheel independent steering vehicle to approach the parking surface so that the longitudinal direction of the four-wheel independent steering vehicle becomes parallel to the long side of the parking surface.

5. The apparatus of claim 4, wherein the processor simultaneously controls the front-wheel drive module and the rear-wheel drive module in the CRAB mode, when the longitudinal direction of the four-wheel independent steering vehicle is parallel to the long side of the parking surface, to move the four-wheel independent steering vehicle in the lateral direction to park the vehicle onto the parking surface.

6. The apparatus of claim 2, wherein, when the parking surface is available for parking in the longitudinal direction, the processor checks whether an angle of a longitudinal direction of the four-wheel independent steering vehicle with respect to a reference direction is identical to an angle of a longitudinal direction of the parking surface or an angle of a long side of a rectangle that marks the parking surface with respect to the reference direction.

7. The apparatus of claim 6, wherein, when the angle of the longitudinal direction of the four-wheel independent steering vehicle with respect to the reference direction is not identical to the angle of the long side of the parking surface or the angle of the long side of the rectangle that marks the parking surface with respect to the reference direction, the processor controls the front-wheel drive module and the rear-wheel drive module in opposite directions to each other to rotate the four-wheel independent steering vehicle such that the angle of the long side of the parking surface and the angle of the longitudinal direction of the four-wheel independent steering vehicle with respect to the reference direction are identical.

8. The apparatus of claim 7, wherein, when the angle of the longitudinal direction of the four-wheel independent steering vehicle with respect to the reference direction becomes identical to the angle of the long side of the parking surface or the angle of the long side of the rectangle that marks the parking surface with respect to the reference direction, the processor simultaneously controls the front-wheel drive module and the rear-wheel drive module in the CRAB mode to move the four-wheel independent steering vehicle in the lateral direction within a range in which the four-wheel independent steering vehicle is able to enter the parking surface, and then to move the four-wheel independent steering vehicle in the longitudinal direction onto the parking surface to park the four-wheel independent steering vehicle.

9. A method of controlling a four-wheel independent steering vehicle, the method comprising:

detecting, by a processor, an angle between a longitudinal direction of a parking surface and a longitudinal direction of the four-wheel independent steering vehicle through a sensor module upon parking using a CRAB mode of the four-wheel independent steering vehicle; and performing, by the processor, the parking through selective control of a front-wheel drive module and a rear-wheel drive module, based on information detected through the sensor module, in consideration of at least one of the angle between the four-wheel independent steering vehicle and the parking surface, a position and shape of the parking surface, or a direction of the four-wheel independent steering vehicle entering the parking surface, wherein the performing of the parking comprises when the longitudinal direction of the four-wheel independent steering vehicle is not parallel to a long side of the parking surface, selectively controlling a drive module that drives a wheel closer to the long side of the parking surface, among the front-wheel drive module and the rear-wheel drive module, according to a specified setting, to control the four-wheel independent steering vehicle to move away from the parking surface so that the longitudinal direction of the four-wheel independent steering vehicle becomes parallel to the long side of the parking surface.

* * * * *